United States Patent [19]

Kitagawa et al.

[11] Patent Number: 5,063,095
[45] Date of Patent: Nov. 5, 1991

[54] EXPANDABLE POWDER COATING COMPOSITION, METHOD OF COATING A SUBSTRATE WITH HEAT-INSULATING FOAM AND COMPOSITE MATERIAL OBTAINED THEREBY

[75] Inventors: Katsuji Kitagawa, Kasukabe; Kazutomo Moriguchi, Soka; Tetsuo Miyake, Saitama; Katusya Sano, Chiryu; Kiyoshi Kittaka, Okazaki; Tetsuya Sakakibara, Gamagouri, all of Japan

[73] Assignees: Somar Corporation; Nippondenso Co., Ltd., both of Japan

[21] Appl. No.: 577,663

[22] Filed: Sep. 5, 1990

[30] Foreign Application Priority Data

Sep. 6, 1989 [JP] Japan ................... 1-232024

[51] Int. Cl.$^5$ ................... C08J 9/10
[52] U.S. Cl. ................... 428/35.8; 521/85; 521/95; 521/96; 521/97; 521/134; 521/149; 427/181; 427/189; 428/317.9
[58] Field of Search ........ 521/85, 97, 95, 96, 521/149, 134; 428/35.8, 317.9; 427/181, 189

[56] References Cited

U.S. PATENT DOCUMENTS

| | | | |
|---|---|---|---|
| 3,608,006 | 9/1971 | Hosoda et al. | 521/149 |
| 4,014,770 | 3/1977 | Suzuki et al. | 521/134 |
| 4,424,181 | 1/1984 | Senuma et al. | 521/140 |
| 4,499,210 | 2/1985 | Senuma et al. | 521/139 |
| 4,501,711 | 2/1985 | Senuma et al. | 521/139 |

*Primary Examiner*—Morton Foelak
*Attorney, Agent, or Firm*—Lorusso & Loud

[57] ABSTRACT

An expandable, powder coating composition is disclosed which comprises (a) a thermoplastic resin containing a copolymer of ethylene with vinyl acetate, (b) a cross-linking agent containing an organic peroxide, (c) a blowing agent, and (d) an organic plasticizer. Powder coating of a surface of a tube or box to be used in air conditioners with the coating composition can give a heat-insulating, foamed sheath or lining over the surface.

14 Claims, No Drawings

EXPANDABLE POWDER COATING COMPOSITION, METHOD OF COATING A SUBSTRATE WITH HEAT-INSULATING FOAM AND COMPOSITE MATERIAL OBTAINED THEREBY

This invention relates to an expandable, powder coating composition and to a method of forming a heat-insulating, foamed resin coat over the surface of a substrate such as a metal or resin tube or a box. The present invention is also directed to a composite material obtained by the above method.

Metal or resin tubes of air conditioners used in automobiles, electric cars, buildings, etc. are generally provided with heat-insulating sheaths of foamed resins. Known foamed resin sheaths have been produced by extrusion or by molding in a mold cavity. The conventional methods, however, have problems because sheaths with various different shapes must be prepared so as to conform to various outer shapes of the tubes to be covered, because it is difficult to mount the resulting sheaths on tubes with complicated shapes and because clearance between the sheath and the tube is unavoidable, thus causing a reduction in heat-insulating efficiency. These also apply to a heat-insulating lining of a container or box to be used, for example, for containing a heating or cooling medium.

There is known an expandable resin composition in the form of pellets which includes a thermoplastic resin, a crosslinking agent and a blowing agent. Such a composition has been used for forming foamed articles such as foamed sheets and is not intended to be used as a coating composition. Also known is an expandable powder coating composition containing an epoxy resin. Such a powder coating composition is, however, utilized for vibration isolation or sound-proofing. When utilized for heat-insulation of a substrate such as a metal tube or a box, the epoxy resin-type coating composition poses the following problems: (1) Uniform and fine cells are not obtainable; (2) The foamed coat layer lacks cushioning property (elasticity) or flexibility and tends to cause cracking or peeling from the substrate. When used in conjunction with a filler or a reinforcing material, the fluidity of the composition becomes poor; (3) Thermal conductivity is relatively high and heat-insulating efficiency is not high; (4) The foamed coat layer is not closely contacted with the substrate.

With the foregoing problems of the conventional techniques in view, the present invention provides an expandable, powder coating composition useful for forming a foamed, heat-insulating layer over the surface of a substrate. In accordance with the present invention there is provided an expandable, powder coating composition comprising:

(a) a thermoplastic resin containing a coplymer of ethylene with vinyl acetate;

(b) a cross-linking agent containing an organic peroxide which is capable of reacting with said copolymer at a temperature higher than the melting point of said thermoplastic resin to crosslink said copolymer and which is solid at room temperature;

(c) a blowing agent capable of decomposing and generating a gas when heated to a temperature higher than the melting point of said thermoplastic resin; and (d) an organic plasticizer.

In another aspect the present invention provides a method of coating a substrate with a layer of an expanded resin, comprising the steps of:

powder coating the substrate with the above coating composition at a temperature sufficient to decomposing said blowing agent and to cause said coating composition to expand, thereby to form a layer of the expanded resin over the surface of the substrate.

The present invention also provides a composite material obtained by the above method.

The coating composition according to the present invention gives a foamed coat which is closely contacted with the surface of the substrate, which has excellent heat-insulating property, cushioning property, heat resistance, surface hardness and surface slippage.

The present invention will now be described in detail below.

The thermoplastic resin which serves, upon expansion, as a structural material is a copolymer of ethylene with vinyl acetate or a polymer mixture containing the copolymer as a major component.

The ethylene/vinyl acetate copolymer preferably has a vinyl acetate content of 5-50% by weight, more preferably 15-35% by weight. The melt index (MI) of the copolymer is preferably 0.5-500 g/10 minutes, more preferably 2-100 g/10 minutes. The thermoplastic resin should contain the copolymer in an amount of at least 50% by weight, preferably at least 60% by weight.

If desired, the copolymer may be used in conjunction with one or more auxiliary polymers such as polyvinyl alcohols, partially saponified ethylene/vinyl acetate copolymers, butyral resins, polyolefins (e.g. polyethylenes, ethylene/propylene copolymers, polypropylenes and polybutene-1), polyvinyl chlorides, ethylene/ethyl acrylate copolymers. Of these, the use of an auxiliary polymer having carboxylic acid groups is desirable, since the resulting composition can give a coating having good bonding to the substrate. Such a carboxylic acid group-bearing polymer may be obtained by incorporating a polymerizable, unsaturated carboxylic acid (e.g. maleic anhydride, acrylic acid, methacrylic acid or itaconic acid) into a reaction mixture for the polymerization of the above-described auxiliary polymers so as to copolymerize the unsaturated carboxylic acid. Alternatively, such a carboxylic acid group-bearing auxiliary polymer may be obtained by grafting an unsaturated carboxylic acid on a hydroxyl group-containing polymer such as polyvinyl alcohol or a butyral resin.

An organic peroxide is used as a curing agent for the above thermoplastic resin. Any organic peroxide may be used as long as it can react with the aliphatic unsaturated bonds of the ethylene/vinyl acetate copolymer to cross-link the copolymer. Examples of suitable organic peroxide include dicumyl peroxide, bis(t-butylperoxy)isopropylbenzene, dimethyl-di(t-butylperoxy)hexane and dimethyldi(t-butylperoxy)hexyne. The organic peroxide is generally used in an amount of 0.5-7.0 parts by weight, preferably 1.0-4.0 parts by weight per 100 parts by weight of the thermoplastic resin.

The blowing agent to be used in the powder coating composition is of a heat-decomposition type and may be organic or inorganic one. Illustrative of suitable blowing agents are azodicarbonamide, 2,2'-azobisisobutyronitrile, dinitrosopentamethylenetetramine, 4,4'-oxybisbenzene-sulfonyl hydrazide, p-toluenesulfonyl hydrazide, sodium bicarbonate, ammonium carbonate, sodium borohydride or silicon oxyhydride. These blowing agents may be used by themselves or as a mixture of two or more. When the blowing agent used has a high decomposition temperature, the use of an expansion aid such as zinc oxide is effective in lowering the decomposition temperature. In the coating composition of the present invention, it is desirable to use several kinds of crosslinking agents together with an expansion aid for reasons of broadening the temperature range in which the composition is able to be expanded and of permitting the expansion to proceed uniformly even when the temperature at which the expansion is performed fluctuates. The amount of the blowing agent varies with the kind thereof and the intended expansion ratio and, therefore, is not specifically limited.

A plasticizer is incorporated into the powder coating composition for the purpose of controlling the hardness and cushioning properties of a foamed body obtained therefrom. Both liquid and solid plasticizers may be suitably used. The solid plasticizer to be used in the present invention generally has a melting point of 30°–100° C., preferably 30°–60° C., while the liquid plasticizer generally has a viscosity of 30 cP at 25° C.

Illustrative of suitable plasticizers are esters of aromatic carboxylic acids such as dioctyl phthalate, dibutyl phthalate, diheptyl phthalate, diisononyl phthalate and tri-2-ethylhexyl trimellitate; aliphatic diesters such as di-2-ethylhexyl adipate, di-2-ethylhexanoic acid ester of polyethylene glycol and diisobutyric acid ester of 2,2,4-trimethyl-1,3-diol; and phosphates such as triphenyl phosphate and tributoxyethyl phosphate. Plasticizers having aromatic groups such as dioctyl phthalate and triphenyl phosphate are particularly preferably used for the purpose of the present invention. The plasticizer is generally used in an amount of 5–50 parts by weight per 100 parts by weight of the thermoplastic resin. The preferred amount of the plasticizer is 10–40 parts by weight in the case of a solid plasticizer and 10–30 parts by weight in the case of a liquid plasticizer per 100 parts by weight of the thermoplastic resin.

The coating composition may further contain various additives such as a filler, a coloring agent, a flame retardant and an antioxidant.

As the filler, both organic and inorganic ones may be used. Illustrative of suitable fillers are zirconium, talc, quartz glass, calcium carbonate, magnesium oxide, calcium silicate, silica, aluminum hydroxide, magnesium hydroxide and phenol resin. The particle size of the filler is generally about 104 μm or less (150 mesh (Tyler) or finer), preferably about 0.1–74 μm. The filler is generally used in an amount of 10–100 parts by weight, preferably 20–50 parts by weight per 100 parts by weight of the thermoplastic resin. By controlling the amount and the particle size of the filler, the viscosity of the coating composition in a molten state, and the diameter of cells and the mechanical strength of an expanded body obtained from the coating composition may be controlled.

The coating composition may be obtained by mixing and kneading the above components with each other at a temperature higher than the melting point of the resin, pelleticizing the kneaded mixture, and grinding the pellets. In order to prevent the occurrence of expansion during the mixing stage, a mixing temperature of less than the decomposition temperature of the blowing agent is adopted. Further, the mixing is desired to be carried out at a temperature lower than the temperature at which the cross-linking occurs so that the occurrence of cross-linking is substantially prevented. The grinding of the pellets is generally performed at a temperature of less than 10° C., preferably between −100 and −20° C.

The coating composition preferably has such a particle size distribution that the content of particles with a particle size of 40 mesh (Tyler) or finer is 100% by weight, the content of particles with a particle size of 200 mesh or finer is at least 50% by weight and the content of particles with a particle size of 325 mesh or finer is not greater than 50% by weight, for the purpose of improving the free flow property of the coating composition and thereby facilitating the deposition of the coating composition onto a substrate during the powder coating stage.

Coating of a substrate with the coating composition is carried out in a manner known per se at a temperature sufficient to decompose the blowing agent, to cross-link the resin and to cause said coating composition to expand, thereby to form a layer of the expanded resin over the surface of the substrate. The powder coating may, for example, be carried out by contacting a substrate preheated to a temperature near the decomposition temperature ($T_d$) of the blowing agent (generally at a temperature in the range of $T_d \pm 10°$ C.) with a fluidized mass of the coating composition. By this, the powder of the coating composition deposits on the surface of the substrate and the deposits are melted and undergo both cross-linking and expansion, thereby forming a foamed layer.

As the substrate, there may be suitably used a pipe or a container or a box formed of a ceramic material, of a metal such as aluminum, iron, copper, stainless steel or an aluminum-containing alloy or of a synthetic resin such as polypropylene, polyamide or polyester. The coated layer may be provided on the outer and/or inside surfaces of the substrate.

The expansion ratio of the foamed layer may be controlled by the amount of the blowing agent in the coating composition and the temperature at which the coating is effected, and is preferably 1.5–20, more preferably 2–10. The thickness of the foamed layer is generally 1–15 mm, preferably 2–8 mm.

When a tube is used as the substrate, there may be obtained a thermally insulated, sheathed tube to be used, for example, for connection to respective parts of air conditioners, such as compressors, condensers, expanders and evaporators, through which a cooling or heating medium is passed. When a box is used as the substrate, there may be obtained a thermally insulated box to be used, for example, for containing a cooling or heating medium of a car air conditioner or for accommodating a cooling unit and an evaporator (heat-exchanger) of a car air conditioner.

The following examples will further illustrate the present invention.

EXAMPLE 1

To 100 parts by weight of an ethylene/vinyl acetate copolymer (vinyl acetate content: 30 wt. %, MI: 18 g/10 minutes) were mixed 30 parts by weight of calcium carbonate as a filler, 5 parts by weight of azodicarbonamide as a blowing agent, 3 parts by weight of zinc oxide as an expansion aid, 1.7 parts by weight of dicumylperoxide as a cross-linking agent, 0.5 part by weight of carbon black as a coloring agent, and 10 parts by weight of dioctyl phthalate as a plasticizer. To this mixture was further mixed amorphous silica powder as a free-flow imparting agent in an amount of 0.15% based on the weight of said mixture. The resulting mixture was mixed and then extruded at 120° C. with an extruder. The extrudate was pelleticized and ground at −80° C. to obtain a coating composition in the form of fine powder. The coating composition had such a particle size distribution that the content of particles with a particle size of 40 mesh (Tyler) or finer was 100% by weight, the content of particles with a particle size of 200 mesh or finer was at least 50% by weight and the content of particles with a particle size of 325 mesh or finer was not greater than 50% by weight.

Using the powder coating composition thus obtained, an aluminum tube (diameter: 20 mm, length: 200 mm) heated to 200° C. was subjected to a powder coating and expansion treatment. The foamed layer was found to closely contact with the aluminum surface and to have an expansion ratio of 2.5-3.0, an elongation of 130-140%, a hardness of 20 and a fine, uniform, closed cell structure. The layer also had a good cushioning property (elasticity).

EXAMPLE 2

Example 1 was repeated in the same manner as described except that the amount of dioctyl phthalate was increased from 10 parts by weight to 30 parts by weight. The foamed layer was found to closely contact with the aluminum surface and to have an expansion ratio of 3.0-3.5, an elongation of 140-150%, a hardness of 10 and a fine, uniform, closed cell structure. The layer also had a good cushioning property (elasticity).

EXAMPLE 3

Example 1 was repeated in the same manner as described except that the 10 parts by weight of triphenyl phosphate were used as a plasticizer. The foamed layer was found to closely contact with the aluminum surface and to have an expansion ratio of 2.5-3.0, an elongation of 135-145%, a hardness of 15 and a fine, uniform, closed cell structure. The layer also had a good cushioning property (elasticity).

EXAMPLE 4

Example 1 was repeated in the same manner as described except that the 20 parts by weight of triphenyl phosphate were used as a plasticizer. The foamed layer was found to closely contact with the aluminum surface and to have an expansion ratio of 3.0-4.0, an elongation of 145-155%, a hardness of 10 and a fine, uniform, closed cell structure. The layer also had a good cushioning property (elasticity).

COMPARATIVE EXAMPLE 1

Example 1 was repeated in the same manner as described except that the plasticizer was not used at all. The foamed layer had an expansion ratio of 1.2-1.5, an elongation of 115-120%, a hardness of 40, an open cell structure and a rough surface, and lacked cushioning property (elasticity).

In the foregoing examples, the expansion ratio, hardness and elongation were tested by the following methods:

EXPANSION RATIO

The thickness of the coating before expansion ($D_0$) and the thickness of the foamed layer ($D_1$) are measured. Expansion ratio is defined as follows:

Expansion ratio = $D_1/D_0$

Hardness

In accordance with the spring type method specified in Japanese Industrial Standard JIS K6301.

ELONGATION

In accordance with the tensile test method using #1 dumb bell specified in Japanese Industrial Standard JIS K6301.

What is claimed is:

1. An expandable, powder coating composition having a particle size distribution wherein the content of particles with a particle size of 40 mesh or finer is 100% by weight, the content of particles with a particle size of 200 mesh or finer is at least 50% by weight and the content of particles with a particle size of 325 mesh or finer is not greater than 50% by weight and comprising:
   (a) a thermoplastic resin containing a copolymer of ethylene with vinyl acetate;
   (b) a cross-linking agent containing an organic peroxide which is capable of reacting with said copolymer at a temperature higher than the melting point of said thermoplastic resin to crosslink said copolymer and which is solid at room temperature;
   (c) a blowing agent capable of decomposing and generating a gas when heated to a temperature higher than the melting point of said thermoplastic resin; and
   (d) an organic plasticizer.

2. A composition as claimed in claim 1, wherein the content of ethylene/vinyl acetate copolymer in said thermoplastic resin is at least 50% by weight.

3. A composition as claimed in claim 1, wherein said ethylene/vinyl acetate copolymer has a vinyl acetate content of 5-50% by weight and a melt index of 0.5-500 g/10 minutes.

4. A composition as claimed in claim 2, wherein said thermoplastic resin further includes one or more auxiliary polymers selected from the group consisting of polyvinyl alcohols, partially saponified ethylene/vinyl acetate copolymers, butyral resins, polyolefins, polyvinyl chlorides, ethylene/ethyl acrylate copolymers and cartoxylic acid derivatives thereof.

5. A composition as claimed in claim 1, wherein said organic peroxide is selected from the group consisting of dicumyl peroxide, bis(t-butylperoxy)isopropylbenzene, dimethyldi(t-butylperoxy)hexane and dimethyl-di(t-butylperoxy)hexyne.

6. A composition as claimed in claim 1, wherein said blowing agent is selected from the group consisting of azodicarbonamide, 2,2'-azobisisobutyronitrile, dinitrosopentamethylenetetramine, 4,4'-oxybisbenzene-sulfonyl hydrazide, p-toluenesulfonyl hydrazide, sodium bicarbonate, ammonium carbonate, sodium borohydride or silicon oxyhydride.

7. A composition as claimed in claim 1, wherein said plasticizer is a solid having a melting point of 30-100° C. or a liquid having a viscosity of 30 cP at 25° C.

8. A composition as claimed in claim 7, wherein said plasticizer is an aromatic carboxylic acid ester, an aliphatic diester or a phosphate.

9. A composition as claimed in claim 7, wherein said plasticizer is selected from the group consisting of dioctyl phthalate, dibutyl phthalate, diheptyl phthalate, diisononyl phthalate, tri-2-ethylhexyl trimellitate, di-2-ethylhexyl adipate, polyethylene glycol di-2-ethylhexoate, 2,2,4-trimethyl-1,3-diol diisobutyrate, triphenyl phosphate and tributoxyethyl phosphate.

10. A composition as claimed in claim 1, wherein said plasticizer is present in an amount of 5-50 parts by weight per 100 parts by weight of said thermoplastic resin.

11. A composition as claimed in claim 1, further comprising a filler having a particle size of 150 mesh or finer.

12. A method of coating a substrate with a layer of an expanded resin, comprising powder coating the a surface of a substrate with a coating composition according to claim 1 at a temperature sufficient to decomposing said blowing agent and to cause said coating composition to expand, thereby to form a layer of the expanded resin over the surface of the substrate.

13. A composite material obtained by the method according to claim 12.

14. A composite material according to claim 13, wherein said substrate is a pipe or a box formed of a metal or a synthetic polymer and said surface is an inside or outside surface thereof.

* * * * *

UNITED STATES PATENT AND TRADEMARK OFFICE
CERTIFICATE OF CORRECTION

PATENT NO. : 5,063,095
DATED : November 5, 1991
INVENTOR(S) : KITAGAWA et al It is certified that error appears in the above-identified patent and that said Letters Patent is hereby corrected as shown below:

Col. 1, line 58, "coplymer" should read --copolymer--.

Col. 6, line 43, delete "cartoxylic" should read --carboxylic--.

IN THE CLAIMS:

Col. 7, line 9, delete "the".

Signed and Sealed this

Twenty-second Day of June, 1993

Attest:

MICHAEL K. KIRK

*Attesting Officer*         Acting Commissioner of Patents and Trademarks